INVENTOR:
JOHN E. BOUGHTWOOD
BY J. B. Burke
ATTORNEY.

INVENTOR:
JOHN E. BOUGHTWOOD
BY J. B. Burke
ATTORNEY.

INVENTOR:
JOHN E. BOUGHTWOOD
BY J. B. Burke
ATTORNEY.

INVENTOR:
JOHN E. BOUGHTWOOD
BY J. B. Burke
ATTORNEY.

United States Patent Office 3,522,537
Patented Aug. 4, 1970

3,522,537

VESTIGIAL SIDEBAND TRANSMISSION SYSTEM HAVING TWO CHANNELS IN QUADRATURE

John E. Boughtwood, Halsite, N.Y., assignor to The Western Union Telegraph Company, New York, N.Y., a corporation of New York Filed July 25, 1966, Ser. No. 567,768
Int. Cl. H04b 1/68
U.S. Cl. 325—49 1 Claim

ABSTRACT OF THE DISCLOSURE

A data transmission system in which serial data signals are divided and transmitted as two suppressed carrier, vestigial sideband, amplitude modulated, synchronous channels in quadrature phase in a single voice frequency band along with a pilot signal. Received channels are sampled at times when quadrature crosstalk components are zero and are then combined to reproduce original data signals. A phase-locked loop produces local bit timing generation which controls timing of the received channels, sampling and combining, in synchronism with the original data signals.

This invention concerns a bipolar binary digital data system having two suppressed carrier, vestigial sideband, amplitude modulated, synchronous channels transmitted in quadrature in a single channel voice frequency spectrum. The invention is an improvement over the system described in U.S. Pat. 3,152,305.

A principal object of the invention is to provide a system having two vestigial sideband signals transmitted in quadrature and both occupying the same frequency bandwidth.

Another object is to provide a baud doubling system wherein the signal-to-noise ratio is not appreciably affected, because of distribution of power among quadrature signals.

Another object is to provide a data transmission system in which binary data at double the normal single channel bit rate can be transmitted in a single channel voice frequency spectrum, and wherein the data at the original double bit rate can be recovered at a receiving terminal without substantial degradation due to crosstalk interference.

Another object is to provide a dual channel, phase-quadrature, vestigial sideband data transmission system wherein the decrease in signal-to-noise ratio due to doubling the data transmission rate is negligible, since inherent quadrature crosstalk components imposed by each channel on the other are substantially suppressed.

Another object is to provide a phase-locked loop at a receiving terminal in a dual channel, quadrature-related signal transmission system, with a local bit time generator phased to incoming bit streams, so that effects of crosstalk components which are derivatives of incoming bit streams are negated by integrating them to zero at phase-lock.

Another object is to provide means for transmitting data at 4800 bauds over a transmission facility normally used for the transmission of 2400 bauds.

The system will be best understood from the following detailed description taken together with the drawings, wherein.

In the following description, specific numerical bit rates will be mentioned to facilitate understanding of the invention. It should be clearly understood, however, that such bit rates are specified in an exemplary rather than a limiting sense.

Basically the present system involves dual operation of two 2400 baud channels in quadrature in the same voice-frequency spectrum. The system employs two DC suppressed, suppressed carrier, vestigial sideband, amplitude modulated, synchronous channels in quadrature. At the transmitting terminal of the system incoming bits of a 4800 baud serial polar signal are assembled in pairs and transmitted simultaneously at 2400 bauds in phase over two quadrature channels. In addition a 2400 c.p.s. pilot carrier and a reference pilot frequency of 600 c.p.s. are transmitted to a receiving terminal.

After transmission over a line or circuit (assumed distortionless) the demodulated signals in the two channels have the same shape as those transmitted plus the crosstalk between channels due to quadrature distortion inherently introduced by suppression of one sideband in vestigial sideband transmission. The crosstalk produced by a signal pulse in one channel is the first derivative of the pulse causing it. Since signal pulses on the two channels occur simultaneously in time (when transitions occur in both channels), the crosstalk pulses pass through zero at the peak of the signalling pulses, i.e. at the time the received signal is sampled for polarity. Thus the interfering effect of quadrature crosstalk is avoided.

In the single-sideband region of a vestigial sideband transmission system, each signal pulse produces in-phase and quadrature-phase components of equal magnitude. When demodulated by a detector utilizing a carrier in phase with the signal carrier (first channel demodulator) the in-phase signal is demodulated but the quadrature signal phase component is not. However, the demodulator of the second channel uses a carrier in quadrature to that of the first channel so that it rejects the in-phase signal component of the first channel and demodulates its quadrature component. The demodulated quadrature component has the derivative form because all the components of a first channel signal (fundamental and harmonics thereof) are shifted 90° in-phase when demodulated by the second channel demodulator.

Figure 4:
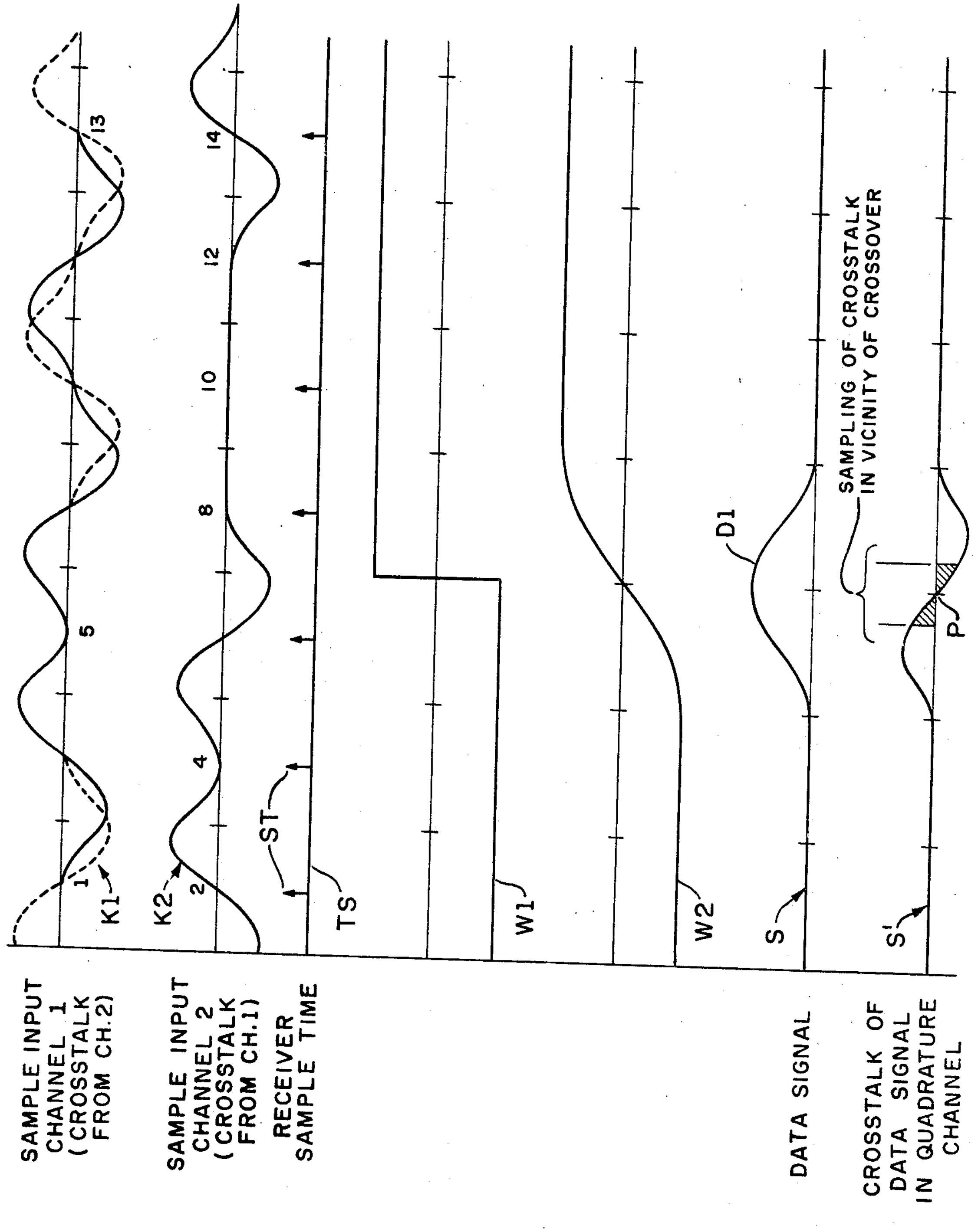

To recapitulate, consider the space-to-mark step waveform W1 shown in FIG. 4, as generated in the transmitter. The waveform W1 is reshaped for transmission as shown by waveform W2. In the present system the DC component is not transmitted, so that the ideal pulse is the first derivative of waveform W2 shown as D1 in waveform S. This pulse represents a space-to-mark transition and requires no increase in high frequency bandwidth over that required for waveform W2. As previously mentioned, the crosstalk in the quadrature channel due to the quadrature component of waveform S is shown by waveform S'. This is the first derivative of waveform S or the second derivative of waveform W2. By taking advantage of the relationships of waveforms W2, S and S', a two-channel phase-quadrature, vestigial sideband system can be provided wherein the increase in noise susceptibility due to doubling the data signal rate does not exceed 3 db over noise in a single channel system for a given transmitted power.

At the receiving terminal of the system a 2400 c.p.s. pilot carrier is used in automatic gain control action and carrier recovery. The carrier for the quadrature channel is derived by a 90° phase shift of the recovered carrier. Since frequency translation errors may occur in the transmission medium, bit timing is derived from the frequency difference between the recovered carrier (2400 c.p.s.r.) and the 600 c.p.s. pilot frequency. The resulting 1800 c.p.s. component is selected from the quadrature channel demodulator with an 1800 c.p.s. filter and divided by three to obtain a 600 c.p.s. clock. A harmonic generator and band-pass filter are used to derive a 4800 c.p.s. reference timing frequency.

A phase-locked loop employing a phase-detector and voltage controlled phase-shifter is used to phase the local bit time generator to the incoming bit streams. This is done by dividing the 4800 c.p.s. reference timing wave to 1200 c.p.s. and with a 90° phase relation to the incoming bit streams, at phase lock, and applying it to the phase detector.

Only the positive signal pulses are used from each channel to prevent signal cancellation. The output of the phase detector is integrated over a suitable period and applied to the voltage controlled phase-shifter at the input to the harmonic generator. Since the frequency at this point in the loop is half the bit frequency applied to the phase detector, a phase control range of ±90° at this point will insure the proper phase-lock. The action is similar to that used to obtain carrier recovery from the 2400 c.p.s. pilot frequency. Only one stable state is possible and ambiguity is avoided. The quadrature crosstalk superimposed on the received signals entering the phase detector integrates to zero since the successive signal pulses on each channel and the associated crosstalk both reverse in phase.

Once correctly phased timing is available, it is then possible to sample each channel simultaneously in time at the center of each bit to determine pulse polarity and to avoid quadrature crosstalk. After the DC signal component is restored to the sampled bits they in turn can be sampled and read out serially in a single 4800 bit stream.

Figure 1:
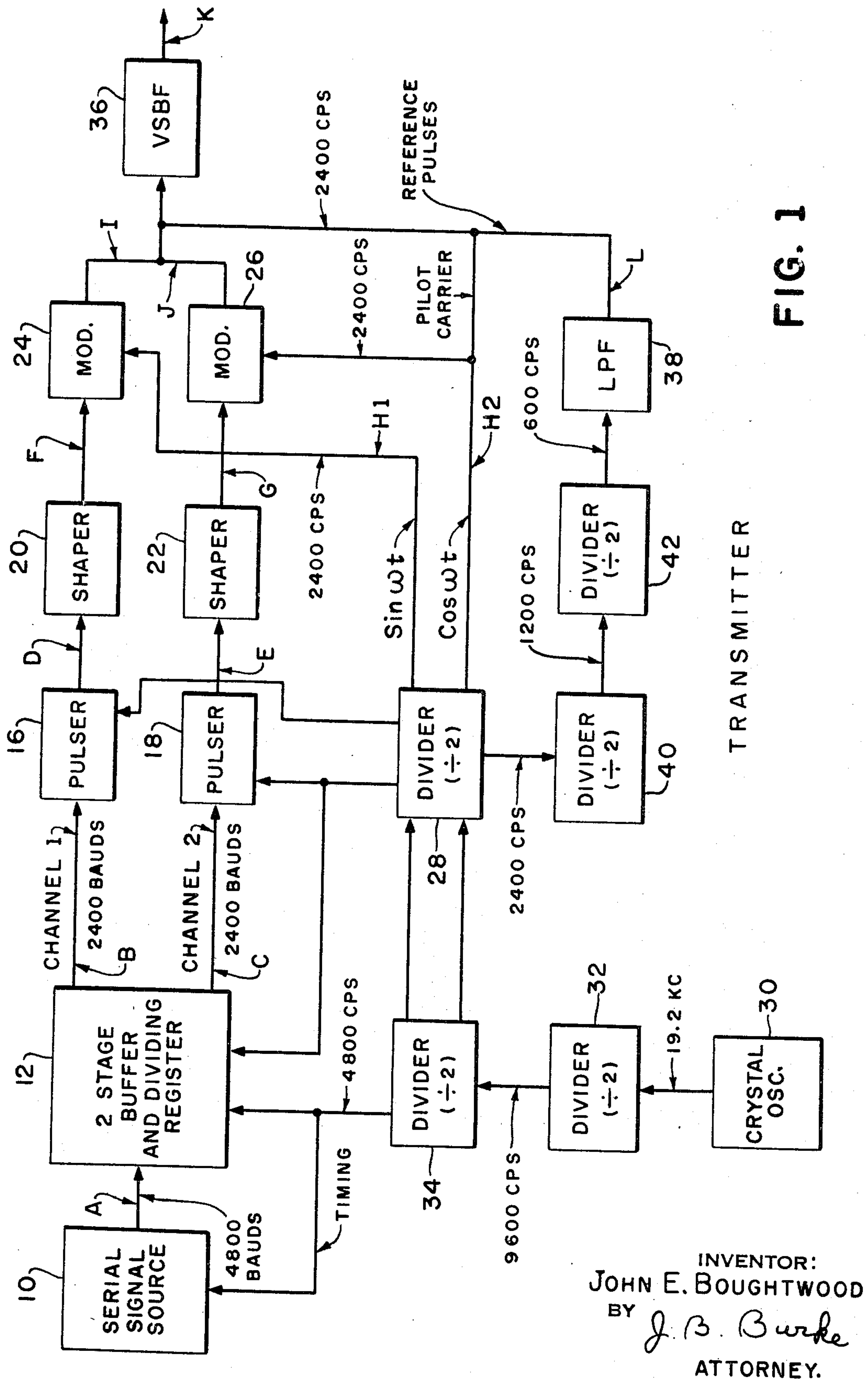
FIG. 1 is a block diagram of an exemplary signal transmitting terminal employed in the system for transmitting data of double bit rate as two single bit rate components in phase quadrature.
Figure 2:
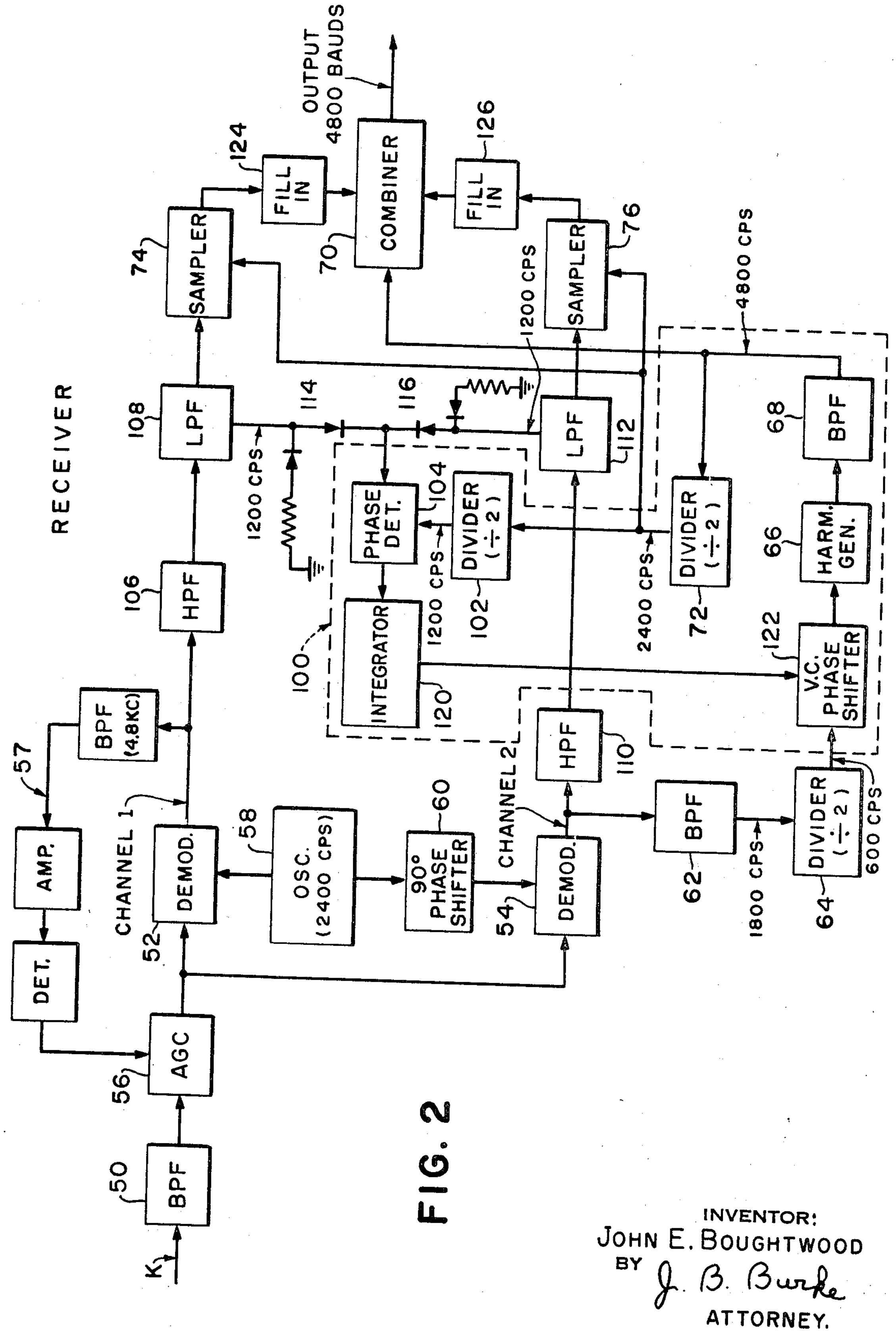
FIG. 2 is a block diagram of an exemplary receiving terminal employed to recover the data at the original double bit rate from the two components transmitted in phase quadrature.
Figure 3:
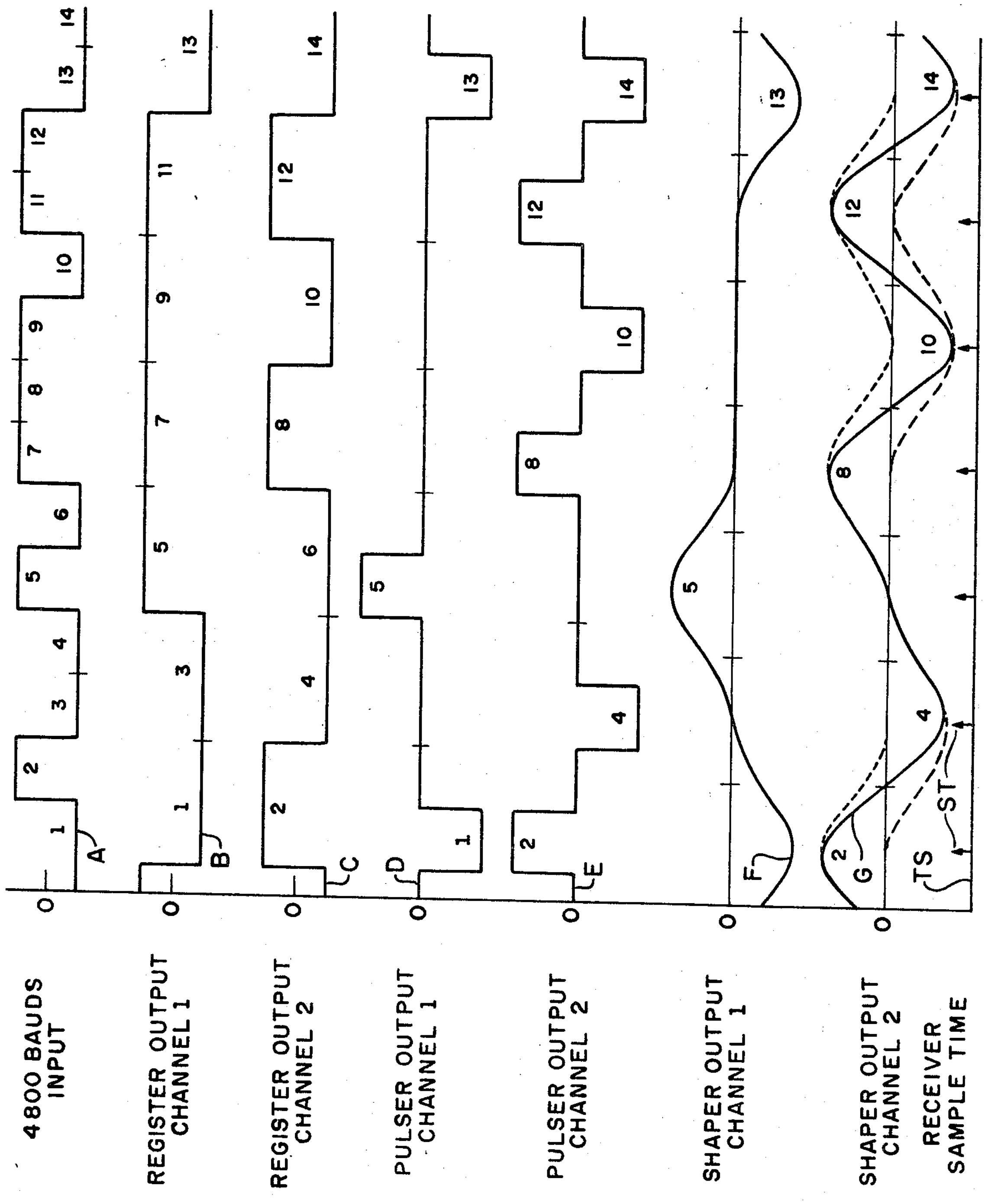
FIGS. 3 and 4 are diagrams of waveforms used in explaining the invention.

Referring now to FIGS. 1 and 3, a serial polar signal source 10 provides mark-space data signals A read out at a rate of 4800 bits per second, for example, to the input of a two-stage buffer and dividing register 12. Timing pulses are applied to the signal source and register 12. The 4800 bauds signal bits are assembled in pairs and divided into two signals B and C of 2400 bauds each. FIG. 3 shows the configurations of the polar data input signal A and the output signals B and C in channels 1 and 2 respectively. The signals B and C are applied to pulser circuits 16, 18 in their respective channels. These pulser circuits generate pulses at each change in polarity of the signals B and C to produce pulse signals D and E; see FIG. 2. The output pulse signals D and E are applied to wave shapers 20 and 22 in the respective channels. The shaping circuits convert the pulse signals D and E respectively to the waveforms F and G shown in FIG. 3. The shaper outputs F and G are then applied to amplitude modulators 24, 26 in the respective channels.

Two 2400 c.p.s. carrier frequencies H1 and H2 in quadrature phase to each other are generated in divider circuit 28. These frequencies are obtained from the 19.2 kc. output of an oscillator 30 applied through successive binary dividers 32, 34 and 28. The carriers H1 and H2 are applied to the modulators 24 and 25 respectively along with signals F and G to obtain two, double sideband, carriers suppressed signals in quadrature carrier phase. The modulated carriers I and J are applied to a vestigial-sideband filter circuit 36. This circuit suppresses the upper sideband of each channel, so that the output K contains only a vestige of the upperside of each channel. The signal frequency H2 is also applied as a pilot frequency to the filter circuit 36. In addition a low-frequency pilot signal L of 600 c.p.s. is applied to the filter circuit 36. Signal L is derived from low-pass filter 38 via successive dividers 40 and 42 driven by a 2400 c.p.s. frequency taken from divider 28.

When transmitting in a vestigial sideband mode the vestigial sideband signal components inherently contain quadrature components due to suppression of one sideband. These quadrature components constitute distorting influences such that the data signal of channel 1 produces crosstalk component in channel 2 and the data signal of channel 2 produces crosstalk components in channel 1. At the receiver, the wave shape of the crosstalk produced by the signal in each channel is the first derivative of the signal pulse producing it.

As indicated by the waveforms S and S′ of FIG. 4, the crosstalk component S′ at the outputs of low pass filters 108, 112 is the first derivative of the signal S. This situation offers a particular advantage when the signals in the respective channels are being synchronously sampled at the receiving terminal, since the crosstalk components are at zero amplitude at the sampling times ST of the data signals indicated in timing scales TS in FIGS. 3 and 4.

FIG. 2 shows a receiver or receiving terminal. The received signals K are applied to a bandpass filter 50 to limit the noise bandwidth. The filtered signals are applied to demodulators 52 and 54 via automatic gain control circuits 56, 57 for recovering the respective channel 1 and channel 2 signals. The carrier demodulating frequencies are provided by a local oscillator 58. One output of the oscillator is applied to demodulator 52 and the other output is applied to demodulator 54 via a 90° phase shifter circuit 60 so as to be in reference phase with the incoming modulated carrier of channel 2.

In order to allow for frequency translations which may occur in the transmission medium during transmission from the transmitter, bit timing pulses are generated at the receiver. This timing is derived from an 1800 c.p.s. frequency obtained from the demodulator 54 of channel 2 by means of a bandpass filter 62. The 1800 c.p.s. frequency is the difference between the incoming 2400 c.p.s. pilot carrier and the 600 c.p.s. reference frequency L indicated in FIG. 1. The bandpass filter 62 passes this 1800 c.p.s. frequency which is then divided by three in divider circuit 64 to produce a 600 c.p.s. sine wave. This wave drives a harmonic generator 66 which produces a reference timing signal of 4800 c.p.s. passed by bandpass filter 68 to combiner circuit 70 where the two 1200 band data streams are reassembled to form the original 4800 band signals.

The 4800 c.p.s. timing signal is also passed to divider circuit 72 to produce a 2400 c.p.s. frequency which is used to drive sampling circuits 74 and 76.

A phase-locked loop circuit 100 is provided at the receiver. This loop circuit serves to phase properly the local bit time generator 66 with respect to the incoming bit streams. In the loop circuit a 1200 c.p.s. reference is obtained from frequency harmonic generator 66 via divider circuit 102, divider circuit 72, and bandpass filter 48. This 1200 c.p.s. frequency is applied to phase-detector circuit 104. Also applied to the phase detector is the positive rectified 2400 baud signal pulses from each channel.

The 2400 baud signal of channel 1 is obtained from demodulator 52 via high pass filter 106 and low pass filter 108. The 2400 baud signal of channel 2 is obtained from demodulator 54 via high pass filter 110 and low pass filter 112. The two 2400 baud signals provided by filters 108 and 112 are passed to the phase-detector circuit 104 via diodes 114 and 116. The phase-detector circuit produces a DC output which is integrated in integrator circuit 120, and the integrated signal is then applied to voltage controlled phase shifted 122 to establish phase-lock. The phase shifter is interposed between the divider circuit 64 which produces a 600 c.p.s. frequency, and harmonic generator 66 from which the 4800 c.p.s. reference frequency is derived.

In this phase-locking arrangement, the integration required for the output of the phase detector 104 also affords an advantage whereby the effects of the quadrature crosstalk on the phase-lock loop is eliminated because the crosstalk is integrated to zero. This is evident from the waveforms S and S' of FIG. 4, wherein the crosstalk S', being the first derivative of the data signal S, integrates to zero and thus has no effect on the phase shifter 122.

With correct phase thus established, each channel signal is then sampled simultaneously in sampling circuits 74 or 76 to determine the pulse polarity and to avoid quadrature crosstalk. The fill-in circuits 122 and 124 restore the DC components to the signals and the combiner 70 then assembles both channel signals into a single serial bit stream of 4800 bauds which is read out serially.

It should be noted that the low-pass filters 108 and 112 remove the 1800 c.p.s. component in the received signal due to the 600 c.p.s. pilot frequency. The high pass filter 110 serves to remove the DC component, created by the 2400 c.p.s. pilot frequency. High pass filter 106 similar to filter 110 is used to insure identity of pulse shapes applied to the sampling circuits 74, 76.

It will now be understood that in the present system channel 1 includes a data signal (F in FIG. 3) along with a crosstalk component from channel 2, indicated by waveform K1 in FIG. 4. The dotted line represents overlapping crosstalk pulses from channel 2. Similarly channel 2 includes a data signal (G in FIG. 3) plus the crosstalk component from channel 1. Since the crosstalk pulses are the first derivatives of the data signals which produced them, they pass through zero at the receiver sampling time and do not contribute to the output signal.

Since the crosstalk of channel 2 is in carrier phase with the data signal in channel 1, it is demodulated in the receiving channel 1 by demodulator 52. Similarly the crosstalk of channel 1 is demodulated in the receiving channel 2 by demodulator 54. Then when the data signals of channels 1 and 2 are sampled in sampling circuits 74 and 76 respectively, the sampling times are such that the crosstalk components contributed by the data signals of transmitted channels 1 and 2 respectively are zero, leaving the sampled data of channels 1 and 2 substantially free of distortion by crosstalk. The sampling times ST of waveforms K1 and K2 as indicated in FIG. 4 occur at times when the channel signals are at maximum amplitude so that the effects of the crosstalk components are substantially nullified.

An advantage obtained by the present system is that the sampling, although occurring substantially instantaneously, does take a finite time during which the crosstalk is symmetrical at the crossover point P; see FIG. 4. Thus the sampled portion of the signal in the immediate vicinity of the crossover point has components of equal magnitude and opposite polarity which add up to zero.

Another advantage of the present system is that the signal-to-noise ratio in the 4800 bauds signal is not materially changed by the transmission method employed. The power required for single channel transmission is distributed between two quadrature channels in such a way as to cause a maximum net loss of only 3 db in the signal-to-noise ratio.

What is claimed is:

1. A data transmission system, comprising a transmitter terminal including:

(a) a source of serial data signals having a pulse repetition rate greater than a voice band of predetermined narrow bandwidth;
(b) means for dividing said signals into two-channels each having half the pulse repetition rate of said source of signals;
(c) means responsive to the signals in each channel to generate flat top pulse trains corresponding to the signals in each channel;
(d) means for shaping the pulse trains in each channel to produce two waveforms differing in phase by 180°;
(e) divider means for generating from said signal source two carrier waves in quadrature phase with each other;
(f) a pair of amplitude modulators;
(g) means for applying said two carrier frequencies and said two waveforms to said modulators respectively so that the modulators produce two double sideband carrier suppressed signals in quadrature phase;
(h) a vestigial sideband filter circuit;
(i) means for applying the double sideband signals to said filter circuit so that the filter circuit suppresses substantially the upper sideband of each double sideband signal and to obtain from said filter circuit amplitude modulated synchronous channels in quadrature with both synchronous channels occupying said narrow bandwidth, and with each synchronous channel containing crosstalk components of the other synchronous channel in quadrature to the signals in the channel;
(j) means for generating reference signal pulses;
(k) means for applying said reference signal pulses and a pilot carrier selected from one of said carrier waves to said filter circuit to pass the same from said filter circuit along with said synchronous channels in quadrature for transmission simultaneously to a receiving terminal;
(l) a receiving terminal for receiving transmitted signals comprising said pilot carrier, reference signal pulses and synchronous channels obtained from the vestigial sideband filter circuit of said transmitter terminal, said receiving terminal including;
(m) means for demodulating the received transmitted signals to produce two pulse bit streams in phase with each other, with each bit stream containing quadrature crosstalk components of the other bit stream, and to produce a reference frequency which is the difference between the pilot carrier and reference signal pulses;
(n) means for sampling the two pulse bit streams at instants when the crosstalk components are substantially zero to suppress said crosstalk components;
(o) a local generator of a reference timing signal;
(p) means for applying said reference frequency to said local generator to control timing thereof in synchronism with said source of serial data signals;
(q) a phase-locked loop having an input receiving said reference timing signal and having an output connected to the sampling means to insure synchronism of said two pulse bit streams, said phase-locked loop including integrator means to reduce to zero quadrature crosstalk effects in said loop;
(r) means for combining the sampled pulse bit streams to reproduce the serial data signals originally produced by said data signal source; and
(s) means for applying said reference timing signal to said combining means to insure that the reproduced serial data signals are in phase with the original serial data signals.

References Cited

UNITED STATES PATENTS

| | | | |
|---|---|---|---|
| 3,134,855 | 5/1964 | Chasek | 179—15 |
| 3,289,082 | 11/1966 | Shumate | 325—30 |
| 3,311,442 | 3/1967 | Jager et al. | 325—42 |
| 3,343,093 | 9/1967 | Van Gerwen | 325—60 |
| 3,378,770 | 4/1968 | Daguet | 325—60 X |
| 3,378,771 | 4/1968 | Van Gerwen et al. | 325—60 X |

ROBERT L. GRIFFIN, Primary Examiner

B. V. SAFOUREK, Assistant Examiner

U.S. Cl. X.R.

325—38, 50, 63